United States Patent
Datta et al.

(10) Patent No.: US 11,108,675 B2
(45) Date of Patent: Aug. 31, 2021

(54) METHODS, SYSTEMS, AND COMPUTER READABLE MEDIA FOR TESTING EFFECTS OF SIMULATED FRAME PREEMPTION AND DETERMINISTIC FRAGMENTATION OF PREEMPTABLE FRAMES IN A FRAME-PREEMPTION-CAPABLE NETWORK

(71) Applicant: Keysight Technologies, Inc., Santa Rosa, CA (US)

(72) Inventors: Pradosh Tapan Datta, Kolkata (IN); Tanuman Bhaduri, Kolkata (IN); Kingshuk Mandal, Kolkata (IN); Alon Regev, Woodland Hills, CA (US); James Robert Bauder, Chatsworth, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 171 days.

(21) Appl. No.: 16/177,019

(22) Filed: Oct. 31, 2018

(65) Prior Publication Data

US 2020/0136953 A1 Apr. 30, 2020

(51) Int. Cl.
*H04L 12/26* (2006.01)
*H04L 12/24* (2006.01)
(Continued)

(52) U.S. Cl.
CPC ........... *H04L 43/50* (2013.01); *H04L 41/145* (2013.01); *H04L 43/0823* (2013.01);
(Continued)

(58) Field of Classification Search
None
See application file for complete search history.

(56) References Cited

U.S. PATENT DOCUMENTS 4,858,112 A 8/1989 Puerzer et al.
5,333,135 A 7/1994 Wendorf
(Continued)

FOREIGN PATENT DOCUMENTS

EP 3 217 614 A1 9/2017

OTHER PUBLICATIONS

"Time-Sensitive Networking (TSN) Playbook," Test Cases and Methodologies, Rev D, Spirent, pp. 1-76 (Year: 2018).*

(Continued)

*Primary Examiner* — Joseph A Bednash

(57) ABSTRACT

Methods, systems, and computer readable media for testing effects of simulated frame preemption and deterministic fragmentation of preemptable frames in a frame-preemption-capable network are disclosed. According to one method, a device under test including at least one processor simulates frame preemption by generating a plurality of simulated preempted frame fragments and an express frame. The test device deterministically orders, independently from MAC merge sublayer fragmentation and ordering, the simulated preempted frame fragments and the express frame for transmission to the DUT. The test device transmits the simulated preempted frame fragments and the express frame to the DUT in an order corresponding to the deterministic ordering. The test device receives a response of the DUT to the simulated preempted frame fragments and the express frame. The test device determines, based on the response of the DUT, whether the DUT operates in accordance with specifications for frame preemption.

20 Claims, 11 Drawing Sheets

(51) Int. Cl.
*H04L 12/801* (2013.01)
*H04L 12/851* (2013.01)
*H04L 12/939* (2013.01)
*H04L 12/861* (2013.01)
*H04L 29/06* (2006.01)

(52) U.S. Cl.
CPC ............ *H04L 43/12* (2013.01); *H04L 47/245* (2013.01); *H04L 47/34* (2013.01); *H04L 49/552* (2013.01); *H04L 49/555* (2013.01); *H04L 49/9057* (2013.01); *H04L 69/166* (2013.01)

(56) References Cited

U.S. PATENT DOCUMENTS

| | | |
|---|---|---|
| 5,343,463 A | 8/1994 | Van Tetering et al. |
| 5,477,531 A | 12/1995 | Mckee et al. |
| 5,600,632 A | 2/1997 | Schulman |
| 5,680,585 A | 10/1997 | Bruell |
| 5,878,032 A | 3/1999 | Mirek et al. |
| 5,878,420 A | 3/1999 | De La |
| 6,028,847 A | 2/2000 | Beanland |
| 6,111,673 A | 8/2000 | Chang et al. |
| 6,172,989 B1 | 1/2001 | Yanagihara et al. |
| 6,233,256 B1 | 5/2001 | Dieterich et al. |
| 6,252,891 B1 | 6/2001 | Perches |
| 6,360,332 B1 | 3/2002 | Weinberg et al. |
| 6,446,121 B1 | 9/2002 | Shah et al. |
| 6,453,345 B2 | 9/2002 | Trcka et al. |
| 6,545,979 B1 | 4/2003 | Poulin |
| 6,601,098 B1 | 7/2003 | Case et al. |
| 6,636,859 B2 | 10/2003 | Banerjee |
| 6,717,917 B1 | 4/2004 | Weissberger et al. |
| 6,728,929 B1 | 4/2004 | Luong |
| 6,789,100 B2 | 9/2004 | Nemirovsky et al. |
| 6,847,613 B2 | 1/2005 | Mimura et al. |
| 6,888,818 B1 | 5/2005 | Gubbi |
| 6,891,855 B2 | 5/2005 | Bruckman |
| 6,950,405 B2 | 9/2005 | Van Gerrevink |
| 6,954,789 B2 | 10/2005 | Dietz et al. |
| 6,958,977 B1 | 10/2005 | Mitrani et al. |
| 7,092,393 B1 | 8/2006 | Westbrook et al. |
| 7,095,744 B2 | 8/2006 | Iny |
| 7,171,440 B2 | 1/2007 | Hanner |
| 7,406,089 B1 | 7/2008 | Rahim et al. |
| 7,475,303 B1 | 1/2009 | Edgar et al. |
| 7,486,673 B2 | 2/2009 | Harijono et al. |
| 7,489,706 B2 | 2/2009 | Hatley et al. |
| 7,525,995 B2 | 4/2009 | Iny |
| 7,526,480 B2 | 4/2009 | Nadeau et al. |
| 7,561,559 B2 | 7/2009 | Hannel et al. |
| 7,631,096 B1 | 12/2009 | Yeh et al. |
| 7,656,880 B1 | 2/2010 | Jones |
| 7,664,026 B2 | 2/2010 | Huang et al. |
| 7,706,378 B2 | 4/2010 | Lincoln et al. |
| 7,830,919 B1 | 11/2010 | Thompson |
| 7,869,367 B2 | 1/2011 | Albrecht et al. |
| 7,961,637 B2 | 6/2011 | McBeath |
| 7,991,007 B2 | 8/2011 | Agarwal et al. |
| 8,090,857 B2 | 1/2012 | Yonge et al. |
| 8,145,450 B2 | 3/2012 | Brown et al. |
| 8,149,730 B1 | 4/2012 | Aybay et al. |
| 8,155,145 B2 | 4/2012 | Kocaturk |
| 8,520,529 B2 * | 8/2013 | Hutchison ............... H04L 43/50 370/241 |
| 8,730,826 B2 | 5/2014 | Regev |
| 8,811,410 B1 | 8/2014 | Jain et al. |
| 8,929,240 B2 | 1/2015 | Huang et al. |
| 9,660,927 B2 | 5/2017 | Akl-Chedid et al. |
| 10,425,321 B2 | 9/2019 | Joseph et al. |
| 2002/0031086 A1 | 3/2002 | Welin |
| 2002/0051466 A1 | 5/2002 | Bruckman |
| 2002/0131425 A1 | 9/2002 | Shalom |
| 2003/0014510 A1 | 1/2003 | Avvari et al. |
| 2003/0117959 A1 | 6/2003 | Taranov |
| 2004/0052259 A1 | 3/2004 | Garcia et al. |
| 2005/0281392 A1 | 12/2005 | Weeks et al. |
| 2006/0088060 A1 | 4/2006 | Fujikami et al. |
| 2006/0286564 A1 | 12/2006 | Peters |
| 2008/0010049 A1 | 1/2008 | Pouchak et al. |
| 2008/0165678 A1 | 7/2008 | Trinh |
| 2008/0298261 A1 | 12/2008 | Rittmeyer et al. |
| 2009/0010158 A1 | 1/2009 | Filsfils et al. |
| 2009/0028152 A1 | 1/2009 | Shimonishi |
| 2009/0067431 A1 | 3/2009 | Huang et al. |
| 2009/0252040 A1 | 10/2009 | Kocaturk |
| 2010/0142556 A1 | 6/2010 | Wang et al. |
| 2010/0302997 A1 | 12/2010 | Park et al. |
| 2011/0044248 A1 | 2/2011 | Saranu et al. |
| 2011/0072307 A1 * | 3/2011 | Hatley ............... H04L 43/50 714/32 |
| 2011/0206064 A1 | 8/2011 | Head et al. |
| 2011/0211591 A1 | 9/2011 | Traub et al. |
| 2011/0261822 A1 | 10/2011 | Battestilli et al. |
| 2011/0261837 A1 | 10/2011 | Valk et al. |
| 2011/0274120 A1 | 11/2011 | Dang et al. |
| 2011/0307871 A1 | 12/2011 | Branda et al. |
| 2012/0066698 A1 | 3/2012 | Yanoo |
| 2012/0079146 A1 | 3/2012 | Hesse |
| 2012/0120820 A1 | 5/2012 | Regev |
| 2012/0131309 A1 | 5/2012 | Johnson et al. |
| 2015/0281028 A1 | 10/2015 | Akhter et al. |
| 2017/0331748 A1 | 11/2017 | Mangin |
| 2018/0041432 A1 | 2/2018 | Göetz et al. |
| 2020/0153722 A1 | 5/2020 | Datta et al. |

OTHER PUBLICATIONS

IEEE Standard for Ethernet Amendment 5: Specification and Management Parameters for Interspersing Express Traffic, IEEE Std 802.3br(TM)-2016, IEEE Computer Society (Year: 2016).*

"MAC Merge Frame Preemption for Interspersing Express Traffic Conformance Test Plan", Version 0.2 Technical Document, Ethernet Testing Services, IEEE 802.3 MAC MErge Sublayer Test Suite v0.2 (Year: 2017).*

"Spirent TTsuite-TSN-Preemption 1.0.0," Release Notes, Spirent, pp. 1-2 (Sep. 7, 2018).

"Spirent TTsuite-TSN-Preemption," Data Sheet, Rev A, Spirent, pp. 1-2 (Sep. 2018).

"Time-Sensitive Networking (TSN) Playbook," Test Cases & Methodologies, Rev D, Spirent, pp. 1-76 (Aug. 2018).

"Preemption standard enables high priority frames and traffic," The Industrial Ethernet Book, Issue 97 / 7, http://www.iebmedia.com/index.php?id=11934&parentid=63&themeid=255&hft=97&showdetail=true&bb=1, pp. 1-3 (May 10, 2018).

"Spirent TestCenter Software and Hardware New Features 4.83," Spirent Communications, pp. 1-17 (Feb. 2018).

"MAC Merge Frame Preemption for Interspersing Express Traffic Conformance Test Plan," Version 0.2 Technical Document, Ethernet Testing Services, IEEE 802.3 MAC Merger Sublayer Test Suite v0.2, pp. 1-84 (May 22, 2017).

"Joint Tutorial," IEEE 802.1 / IEEE 802.3 Tutorial #2, Version 0.2 rev1, pp. 1-61 (Mar. 2015).

Corrected Notice of Allowability for U.S. Appl. No. 16/191,094 (dated May 21, 2020).

Non-Final Office Action for U.S. Appl. No. 16/191,094 (dated Jan. 17, 2020).

Commonly-assigned, Co-pending U.S. Appl. No. 16/191,094 for "Methods, Systems, And Computer Readable Media For Measuring Delivery Latency in a Frame-Preemption Capable Network," (Unpublished, filed Nov. 14, 2018).

Zhou et al., "Analysis and Implementation of Packet Preemption for Time Sensitive Networks," IEEE, pp. 1-6 (2017).

Notice of Allowance and Fee(s) Due for U.S. Appl. No. 16/191,094 (dated Apr. 27, 2020).

Nasrallah et al., "Ultra-Low Latency (ULL) Networks: A Comprehensive Survey Covering the IEEE TSN Standard and Related ULL Research," arXiv:1803.07673v1, pp. 1-59 (Mar. 20, 2018).

(56) References Cited

OTHER PUBLICATIONS

Notice of Allowance and Fee(s) Due and Examiner-Initiated Interview Summary for U.S. Appl. No. 12/948,582 (dated Mar. 31, 2014).
Advisory Action After the Filing of an Appeal Brief for U.S. Appl. No. 12/948,582 (dated Jun. 6, 2013).
Advisory Action Before the Filing of an Appeal Brief for U.S. Appl. No. 12/948,582 (dated Mar. 14, 2013).
Final Office Action for U.S. Appl. No. 12/948,582 (dated Jan. 10, 2013).
Non-Final Office Action for U.S. Appl. No. 12/948,582 (dated Oct. 23, 2012).

* cited by examiner

FIG. 9

METHODS, SYSTEMS, AND COMPUTER READABLE MEDIA FOR TESTING EFFECTS OF SIMULATED FRAME PREEMPTION AND DETERMINISTIC FRAGMENTATION OF PREEMPTABLE FRAMES IN A FRAME-PREEMPTION-CAPABLE NETWORK

TECHNICAL FIELD

The subject matter described herein relates to testing network devices. More particularly, the subject matter described herein relates to methods, systems, and computer readable media for testing effects of simulated frame preemption and deterministic fragmentation of preemptable frames in a frame-preemption-capable network.

BACKGROUND

Ethernet has become the de-facto data networking technology. It has been tested over time and has gained dominance in data communications. Currently, Ethernet is being extended to industrial networks where robots, machines, and sensors communicate among themselves to take action collectively. To be suitable for industrial networks Ethernet needs to overcome some of its weaknesses. One weakness of conventional Ethernet protocol is head-of-line blocking. Head-of-line blocking occurs when Ethernet frames associated with different traffic flows share an egress queue. In one example, a large frame of non-real-time traffic, such as a file download, can delay transmission of frames of time-critical traffic located behind the large frame in the output queue. Delaying transmission of time critical traffic, such as voice or video traffic, can result in poor quality of service for end users.

To avoid some of the difficulties associated with conventional Ethernet, time sensitive networking or TSN standards have been defined. Time sensitive networking is a set of standards developed by the Institute of Electrical and Electronics Engineers (IEEE). Specifically, time sensitive networking standards are being developed by the time sensitive networking task group of the IEEE 802.1 working group. The TSN task group was formed in November of 2012 by renaming the existing audio/video bridging task group. As part of the TSN standard, Ethernet frames can be preempted and fragmented. For example, a low priority frame of non-real-time traffic that may block or delay transmissions of higher priority real-time traffic can be preempted by the real time traffic and transmitted in fragments to the destination. By "preempted", it is meant that even after the low-priority frame has started its transmission onto the wire to the next hop, the transmission is stopped after some, but not all, of the frame has been transmitted. The higher priority real-time frames are then transmitted. The portion of the frame that has already been transmitted forms the initial fragment, and the remainder of the frame forms continuation fragments Frame preemption represents a significant shift from conventional Ethernet where a packet is transmitted in its entirety to the next hop once transmission is started and travels as a whole, rather than in fragments. When frames are preempted and fragmented, the impact of preemption and fragmentation needs to be measured. It is desirable that a network test tool be capable of measuring the effects of frame preemption and fragmentation on the network.

Current test tools that test the effects of frame fragmentation randomly fragment packets. Because frame fragmentation is random, test conditions are not repeatable. As a result, consistent evaluation of devices under test to specific frame preemption conditions is not possible.

Accordingly, there exists a need for methods, systems, and computer readable media for testing the effects of simulated frame preemption and deterministic fragmentation of preemptable frames in a frame-preemption-capable network.

SUMMARY

Methods, systems, and computer readable media for testing effects of simulated frame preemption and deterministic fragmentation of preemptable frames in a frame-preemption-capable network are disclosed. According to one method, a device under test including at least one processor simulates frame preemption by generating a plurality of simulated preempted frame fragments and an express frame. The test device deterministically orders the simulated preempted frame fragments and the express frame for transmission to the DUT. Deterministically ordering the simulated preempted frame fragments and the express frame for transmission to the DUT includes setting an order of the preempted frame fragments and the express frame independently from medium access control (MAC) merge sublayer fragmentation and ordering so that the order can be repeated in subsequent tests. The test device transmits the simulated preempted frame fragments and the express frame to the DUT in an order corresponding to the deterministic ordering. The test device receives a response of the DUT to the simulated preempted frame fragments and the express frame. The test device determines, based on the response of the DUT, whether the DUT operates in accordance with specifications for frame preemption.

According to one aspect of the subject matter described herein, generating the simulated preempted frame fragments includes generating merge sublayer packets (mPackets).

According to another aspect of the subject matter described herein generating a plurality of simulated preempted frame fragments includes generating fragments of at least one simulated preempted frame, wherein the fragments include an initial fragment and one or more continuation fragments. In one test scenario, deterministically ordering the simulated preempted frame fragments and the express frame includes sequentially ordering the continuation fragments without omitting any of the continuation fragments. In this scenario, determining whether the DUT operates in accordance with specifications of the frame preemption—includes determining whether the DUT properly reassembles at least one whole frame.

In an alternate test scenario, deterministically ordering the simulated preempted frame fragments includes injecting a misordered continuation frame fragment in the sequence of fragments to be transmitted to the DUT. In this scenario, determining whether the DUT operates in accordance with specifications of frame preemption includes determining whether the DUT reports a reassembly error in response to the misordered frame fragment.

In yet another alternate test scenario, generating the simulated preempted frame fragments includes generating frame fragments with invalid frame check sequence values. For example, generating fragments with invalid frame check sequence values may include inserting a merge sublayer cyclic redundancy check (mCRC) code instead of a frame check sequence value in a last continuation fragment of a simulated preempted frame. In this scenario, determining whether the DUT operates in accordance with specifications of frame preemption may include determining whether the DUT reports a frame reassembly error in response to the invalid frame check sequence values.

According to another aspect of the subject matter described herein, a method for testing a device for proper operation in a frame-preemption-capable network includes receiving a merge sublayer packet (mPacket) stream definition and automatically generating initial and continuation mPackets with automatically generated frame counts, mPacket cyclic redundancy check (mCRC) values, and frame check sequence (FCS) values According to another aspect of the subject matter described herein, a system for testing effects of simulated frame preemption and deterministic frame fragmentation on a device under test (DUT) in a frame-preemption-capable network includes a network test tool including at least one processor. A deterministic frame preemption and fragmentation simulator implemented by the network test tool simulates frame preemption by generating a plurality of simulated preempted frame fragments and an express frame, deterministically ordering the simulated preempted frame fragments and the express frame for transmission to the DUT, where deterministically ordering the simulated preempted frame fragments and the express frame for transmission to the DUT includes setting an order of the preempted frame fragments and the express frame independently from medium access control (MAC) merge sublayer fragmentation and ordering so that the order can be repeated in subsequent tests, and transmitting the simulated preempted frame fragments and the express frame to the DUT in an order corresponding to the deterministic ordering. A frame preemption response verification module implemented by the network test tool receives a response of the DUT to the simulated preempted frame fragments and the express frame; and determining, based on the response of the DUT, whether the DUT operated in accordance with specifications for frame preemption.

According to one aspect of the subject matter described herein, the deterministic frame preemption and fragmentation simulator is configured to generate merge sublayer packets (mPackets).

According to another aspect of the subject matter described herein, the deterministic frame preemption and fragmentation simulator is configured to generate fragments of at least one simulated preempted frame, wherein the fragments include an initial fragment and one or more continuation fragments. In one test scenario, the deterministic frame preemption and fragmentation simulator is configured to sequentially order the continuation fragments without omitting any of the continuation fragments. In this test scenario, the frame preemption response verification module is configured to determine whether the DUT properly reassembles at least one frame.

In an alternate test scenario, the deterministic frame preemption and fragmentation simulator is configured to inject a misordered continuation frame fragment in the fragments to be transmitted to the DUT. In this test scenario, the frame preemption response verification module is configured to determine whether the DUT reports a reassembly error in response to the misordered frame fragment.

In yet another alternate test scenario, the deterministic frame preemption and fragmentation simulator is configured to generate frame fragments with invalid frame check sequence values. In this test scenario, the frame preemption response verification module is configured to whether the DUT reports a frame reassembly error in response to the invalid frame check sequence values.

According to another aspect of the subject matter described herein, the deterministic frame preemption and fragmentation simulator includes an auto-configuration module that receives a merge sublayer packet (mPacket) stream definition and automatically generates initial and continuation mPackets with automatically generated frame counts, mPacket cyclic redundancy check (mCRC) values, and frame check sequence (FCS) values According to yet another aspect, the subject matter described herein includes a non-transitory computer readable medium having stored thereon executable instructions that when executed by a processor of a computer control the computer to perform steps. The steps include simulating frame preemption by generating a plurality of simulated preempted frame fragments and an express frame. The steps further include deterministically ordering the simulated preempted frame fragments and the express frame for transmission to a device under test (DUT). Deterministically ordering the simulated preempted frame fragments and the express frame for transmission to the DUT includes setting an order of the preempted frame fragments and the express frame independently from medium access control (MAC) merge sublayer fragmentation and ordering so that the order can be repeated in subsequent tests. The steps further include transmitting the simulated preempted frame fragments and the express frame to the DUT in an order corresponding to the deterministic ordering. The steps further include receiving a response of the DUT to the simulated preempted frame fragments and the express frame. The steps further include determining, based on the response of the DUT, whether the DUT operated in accordance with specifications for frame preemption.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, of which:

FIG. 9 is a block diagram illustrating two successive fragmented preemptable frames and express frames;

DETAILED DESCRIPTION

Conventional Ethernet provides best effort delivery service, i.e., a frame originated from an ingress node reaches its destination in a best effort manner. In best effort delivery service, a frame may reach the destination on time, the frame may be delayed, or the frame may not reach the destination at all. The reason for this unpredictability is that the outgoing queue of a switch might be full when a new frame arrives. As a result, additional incoming frames may be queued, dropped, or delayed.

An outgoing port of an Ethernet switch can transmit only one frame at a time. If the currently transmitting frame is long (for example, a flow for a file back-up), urgent frames (for example, frames carrying instructions for a robot) will queue up behind the long frame. If the queue gets full, then the urgent frames will be dropped. This is shown in FIG. 1.

Figure 1:
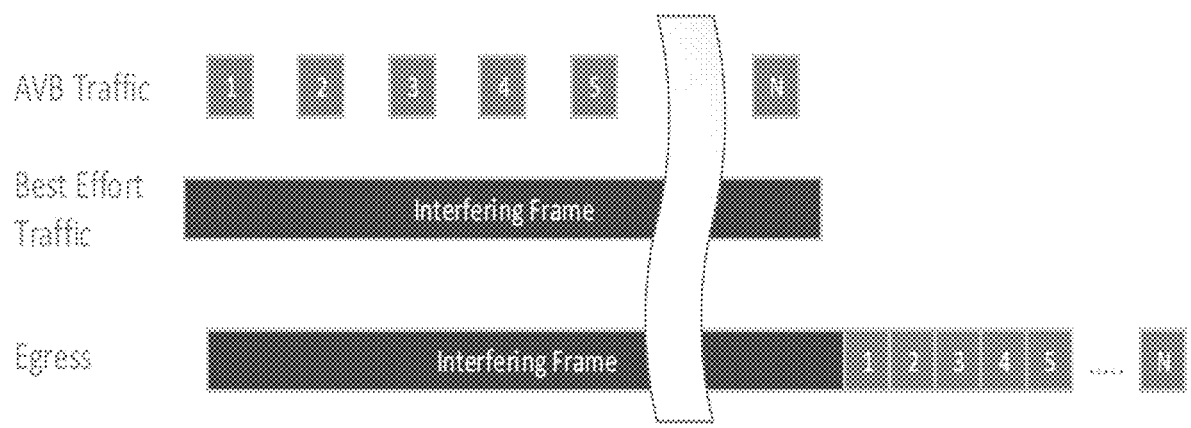
FIG. 1 is a block diagram illustrating interference among frames in a conventional Ethernet network.

Referring to FIG. 1, the topmost row illustrates frames 1-N of audio-video bridging (AVB) traffic. AVB traffic carries streaming audio and video data, which must be delivered with precise timing without interference or delay caused by other traffic. For example, audio data and video data may be transmitted in separate streams. In some applications, the audio and video data must be synchronized. If transmission of either the audio or video data is delayed, the streams may be out of sync at the receiver, which is undesirable.

The second row in FIG. 1 illustrates an interfering frame. The interfering frame may be a large frame of non-real-time data, such as a file backup. If the interfering frame and the AVB frames share the same output port (i.e. egress port) in a network switch, the interfering frame will prevent on-time transmission of the AVB frames. This interference is illustrated by the third row in FIG. 1. In the third row of FIG. 1, the interfering frame delays transmission of the AVB frames at the egress of the network switch, which can result in undesirable effects, such as video being delayed or out of sync with audio in AVB networks.

To overcome this problem, Ethernet fragmentation or frame preemption is a new technology introduced by IEEE TSN standards. In a frame-preemption-capable switch, transmission of a non-urgent frame can be stopped during its transmission. The urgent frames will be transmitted, and then the remainder of the non-urgent frame will resume transmission. Stopping a frame during transmission is not possible in traditional Ethernet.

Figure 2:
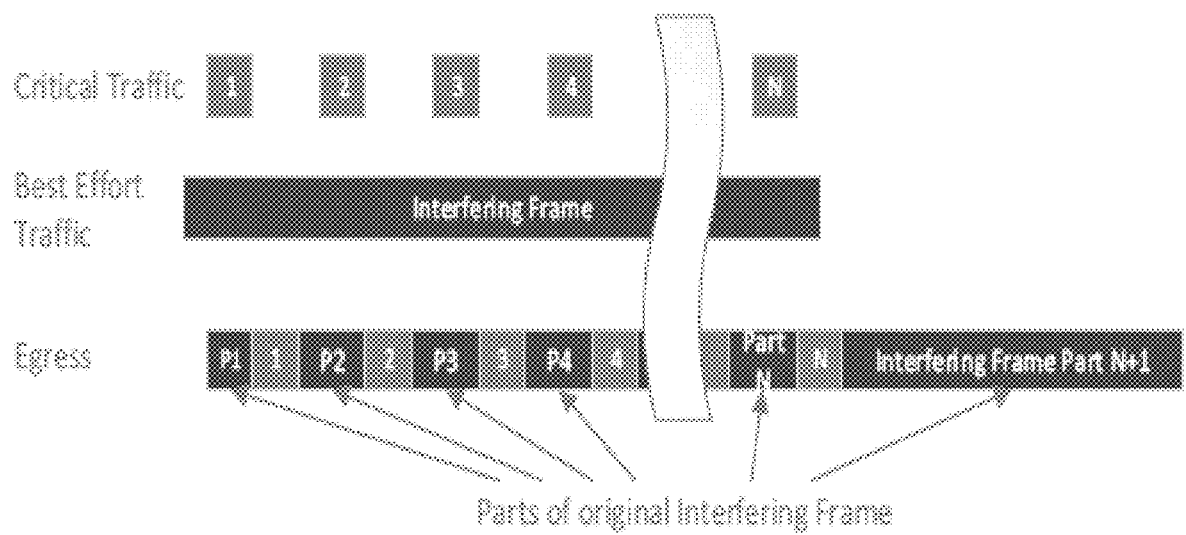
FIG. 2 is a block diagram illustrating frame preemption and fragmentation in a frame-preemption-capable network.

When frame preemption is implemented, the wire or transmission medium will see fragmented Ethernet frames intermixed with urgent or express frames as shown in FIG. 2. In FIG. 2, the topmost row illustrates critical traffic, such as AVB traffic, that must be delivered on time. In the parlance of time sensitive networks, the critical traffic is referred to as express frames. The second row in FIG. 2 illustrates an interfering frame of non-time-critical traffic. The third row in FIG. 2 illustrates fragmentation of the interfering frame and the intermixing of the fragments of the interfering frame with frames of the critical traffic that preempt transmission of the interfering frame. In FIG. 2, fragment P1 is the first fragment of the interfering frame and is followed by critical frame number 1. Next, fragment P2 occurs, which is followed by critical or express frame number 2, and so forth. Once all of the critical frames are transmitted, the remainder of the interfering frame will be transmitted. It is desirable to test the response of a network device to frame preemption and accurate fragmentation of preemptable frames.

It should be noted that fame preemption and fragmentation occur in hop-by-hop manner. What this means is that the same fragments do not travel (from source of origin to the final destination) through multiple hops or multiple switches. Once the fragments reach the first transit switch, the first transit switch will reassemble the received fragments on its receive/ingress port, before forwarding reassembled frame to the next switch towards the destination. While forwarding the reassembled frame to the next switch, the current switch may re-fragment the frame based on the queue status at its egress port towards the destination.

A test tool according to the subject matter described herein may be capable of testing the reassembly capability of the device under test to ensure its robustness and fault tolerance. To test the reassembly capability, the tool must be capable of sending a predictable stream of preempted fragments to make the device reassemble the frame correctly. If the delivery of preempted fragments is not predictable and repeatable in a test network then it becomes difficult to debug when a device under test fails to reassemble any frame.

Figure 3:
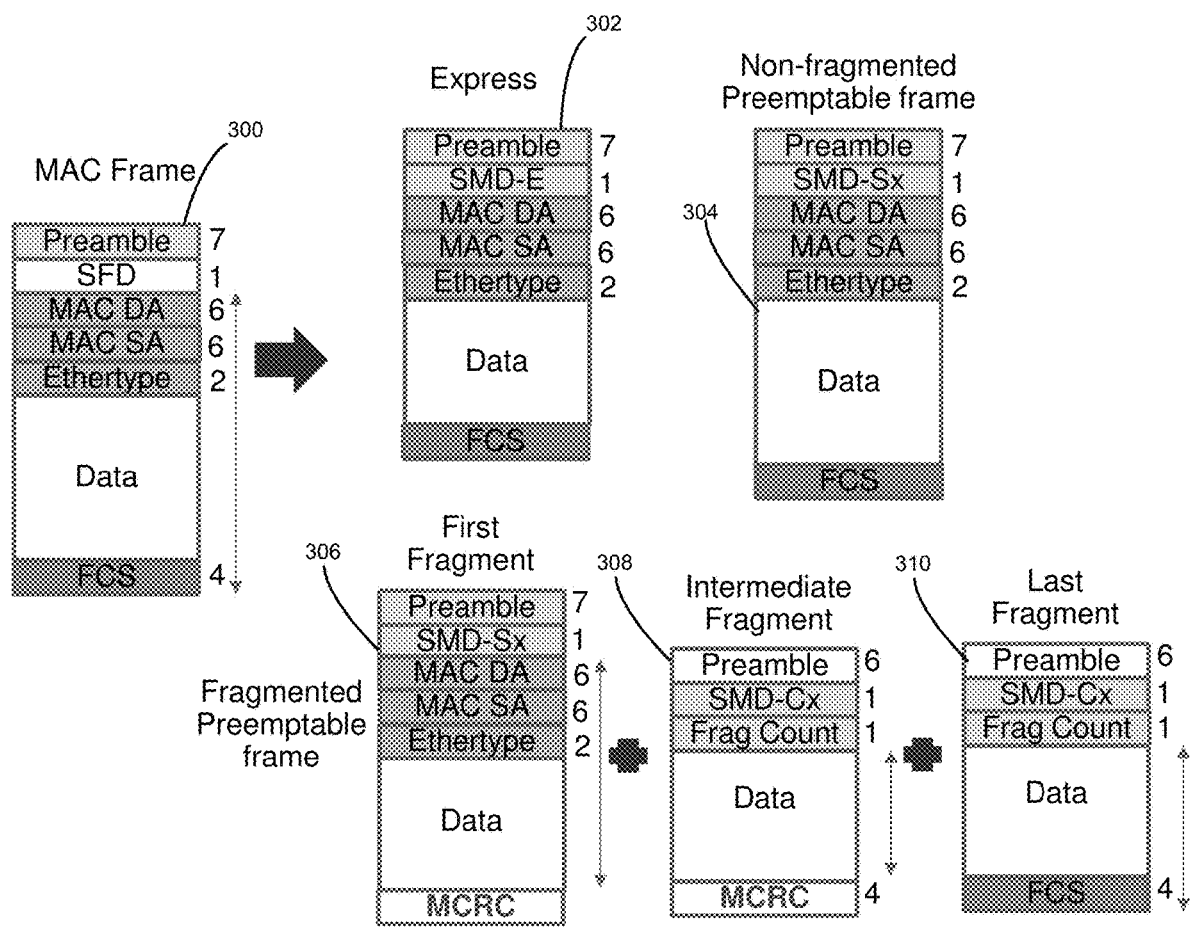
FIG. 3 is a diagram illustrating examples of merge packets (m Packets) that may be generated by a test tool for testing the effects of frame preemption and fragmentation in a frame-preemption-capable network.

To achieve predictability in delivery of preempted fragments, a test tool as described herein may be capable of generating individual frame fragments of different types, such as initial mPackets (start if mPacket delimiter (SMD)-S0), continuation mPackets (SMD-S1, SMD-S2, etc.) In frame-preemption-capable networks, the medium access control (MAC) merge sublayer controls frame preemption and packet fragmentation. A test tool as described herein simulates the merge sublayer by generating packet fragments of a preemptable fame and interspersing the packet fragments with express fames. Frames generated by the merge sublayer are referred to as mPackets. FIG. 3 illustrates mPacket formats that may be generated by the test tool described herein. In FIG. 3, frame 300 is an unfragmented MAC frame. Unfragmented MAC frame 300 includes a preamble, MAC source address, MAC destination address, Ethertype, and frame check sequence (FCS). Frame 302 is express frame that is to be transmitted with high priority. The express frame includes a preamble, an SMD code that identifies the frame as express frame, a MAC source address, a MAC destination address, an Ethertype, data, and frame check sequence. A non-fragmented preemptable frame 304 includes a preamble, an SMD code that is used (along with frame check sequence) to identifies it as a preemptable frame, a MAC source address, a MAC destination address, an Ethertype, data, and a frame check sequence.

A test tool as described herein may generate initial fragments and intermediate or continuation fragments of preemptable frames. In FIG. 3, fragment 306 is an example of an initial fragment that may be generated by the test tool described herein. Initial fragment 306 includes a preamble, and SMD code identifying the fragment as an initial fragment, a MAC destination address, a MAC source address, an Ethertype, data, and a merge sublayer packet cyclic redundancy check (mCRC) code. Intermediate or continuation fragment 308 includes a preamble, an SMD code identifying the fragment as a continuation fragment, a fragment count, data, and an mCRC code. There may be multiple intermediate fragments generated, depending on the size of the unfragmented frame. The last continuation fragment 310 includes a preamble, an SMD code, a fragmentation count, data, and a frame check sequence instead of an mCRC code. A test tool as described herein is capable of generating express frames, such as the express frame 302 and intermixing the express frames with mPacket frames, such as mPacket frames 306, 308, and 310. The test tool performs the deterministic ordering of the mPackets and the express frame so that tests can be repeated and results can be measured. Flexibility in configuration of the test tool allows simulation of real time network errors.

As illustrated in FIG. 3, the mPackets generated by the test tool described herein may have SMD codes. Tables 1 and 2 shown below illustrate SMD codes and fragmentation codes that a test tool may insert in simulated M-packets.

TABLE 1

SMD Codes

| mPacket type | Frame # | SMD |
| --- | --- | --- |
| SFD (express) | NA | 0xD5 |
| SMD-Sx | 0 | 0xE6 |
| Preemptable | 1 | 0x4C |
| frame start | 2 | 0x7F |
|  | 3 | 0xB3 |
| SMD-Cx | 0 | 0x61 |
| Non-initial | 1 | 0x52 |
| fragment | 2 | 0x9E |
|  | 3 | 0xAD |
| Verify |  | 0x07 |
| Respond |  | 0x19 |

TABLE 2

Fragmentation Codes

| Frag Count | Frag |
| --- | --- |
| 0 | 0xE6 |
| 1 | 0x4C |
| 2 | 0x7F |
| 3 | 0xB3 |

In a frame-preemption-capable, network the original frame can be delivered in smaller fragments and each fragment can have a different length from other fragments and can be delivered at a different time. In order to achieve predictability of preempted fragments the test tool described herein may allow deterministic configuration and ordering of preempted frame fragments.

Figure 4:
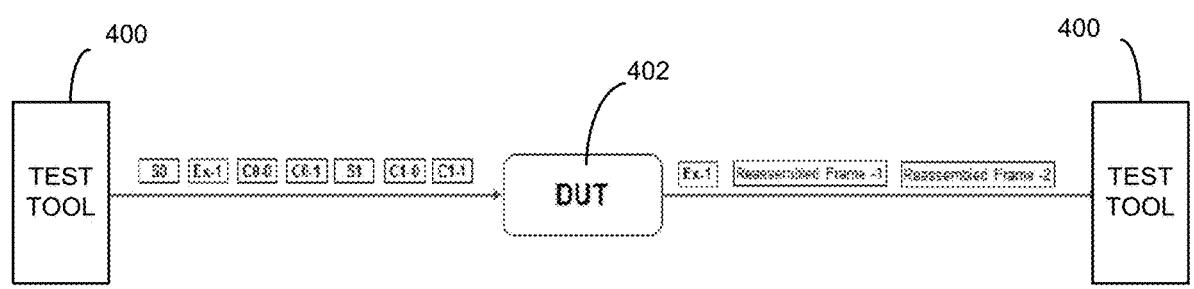
FIG. 4 is a block diagram illustrating simulated frame preemption and deterministic fragmentation of preemptable frames by a test tool according to a first test scenario.

FIG. 4 illustrates a scenario in which a test tool 400 generates a simulated deterministic ordering of mPackets, including mPackets that carry preempted fragments and mPackets that carry express frames, transmits the packets to a device under test, and determines whether the device under test properly reassembles the preempted frames. In the ordering illustrated in FIG. 4, the mPackets are transmitted to device under test 402 in order from left to right. Accordingly, test tool 400 transmits an initial mPacket or fragment S0 of a first simulated preempted frame followed by an express mPacket or frame Ex-1, followed by a first continuation mPacket or fragment C0-0 of the first preempted frame, and followed by the second continuation mPacket or fragment C0-1 of the first preempted frame. The transmission of the fragments of the first preempted frame is followed by the fragments or mPackets of the second preempted frame. In FIG. 4, these mPackets or fragments are initial mPacket or fragment S1, continuation mPacket or fragment C1-0, and continuation mPacket or fragment C1-1.

Because the sequence of fragments of the two preempted packets is complete, DUT 402 should properly reassemble the frames. In this example, DUT 402 outputs express frame Ex-1 followed by reassembled frame 1, which is followed by reassembled frame 2. Test tool 400 receives the express frame and the reassembled frames and determines that DUT 402 is operating as per frame preemption network specifications.

Figure 5:
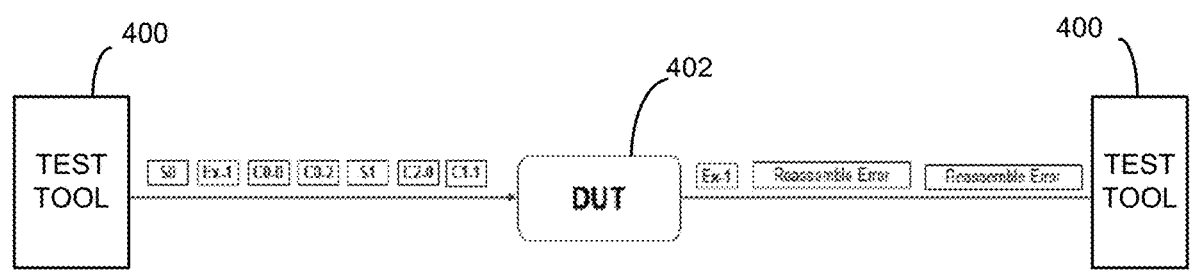
FIG. 5 is a block diagram illustrating simulated frame preemption and deterministic fragmentation of preemptable frames by a test tool according to a second test scenario.

FIG. 5 illustrates an alternate scenario in which test tool 400 injects an error in the sequence of mPackets or fragments transmitted to DUT 402. Referring to FIG. 5, test tool 400 generates a deterministic ordering of fragments or mPackets including an initial fragment or mPacket S0 of a first preempted frame, an express frame Ex-1, a first continuation fragment C0-0 of the first preempted frame, followed by a third continuation fragment C0-2 of the first preempted frame. The third continuation fragment C0-2 is erroneous because the second continuation fragment C0-1 should be transmitted after the first continuation fragment C0-0.

In the second group of fragments, test tool 400 sends the initial fragment S1 followed by a first continuation fragment C2-0 for a third preempted frame, instead of the first continuation fragment C1-0 for the second preempted frame, which should also result in a reassembly error. When device under test 402 receives the sequence of frames illustrated in FIG. 5, device under test 402 outputs express frame Ex-1 followed by two reassembly errors because neither of the transmitted preempted frames should be reassembled based on the packet fragments that were transmitted.

Figure 6:
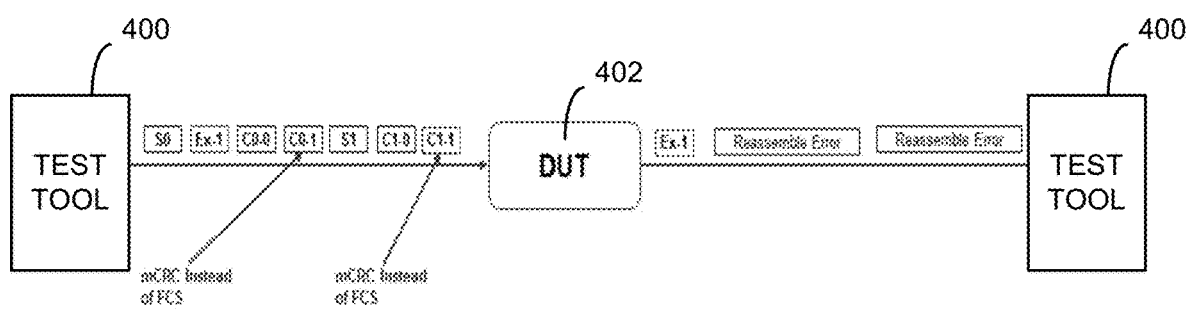
FIG. 6 is a block diagram illustrating simulated frame preemption and deterministic fragmentation of preemptable frames by a test tool according to a third test scenario.

In a third test scenario illustrated in FIG. 6, test tool 400 inserts mCRC codes in the last fragment of each frame instead of frame check sequences. As illustrated in FIG. 3, the last fragment of a frame should include a frame check sequence instead of an mCRC code. In FIG. 6 test tool 400 generates and sends initial fragment S0 of a first preempted frame, followed by an express frame Ex-1, followed by a continuation fragment C0-0 of the first preempted frame and a last continuation fragments C0-1 of the first preempted frame. In the last fragment C0-1, test tool 400 inserts an mCRC code instead of a frame check sequence. Similarly, test tool 400 transmits an initial fragment S1 of a second preempted frame, followed by a first continuation fragment C1-0 of the second preempted frame, and a second fragment C1-1 of the second preempted frame. The second and final fragment of the second preempted frame includes an mCRC code instead of a frame check sequence.

Because the mCRC codes instead of the frame check sequences are inserted in the last continuation fragment of each frame, DUT 402 should output reassembly errors for both of the frames. In the illustrated example, DUT 402 outputs the express frame and two reassembly errors, which is the expected response of a properly operating DUT to the scenario illustrated in FIG. 6. Accordingly, test tool 400 may determine that DUT 402 is operating in accordance with frame preemption specifications and may output an indication that DUT 402 is operating in accordance with frame preemption network specifications.

Figure 7:
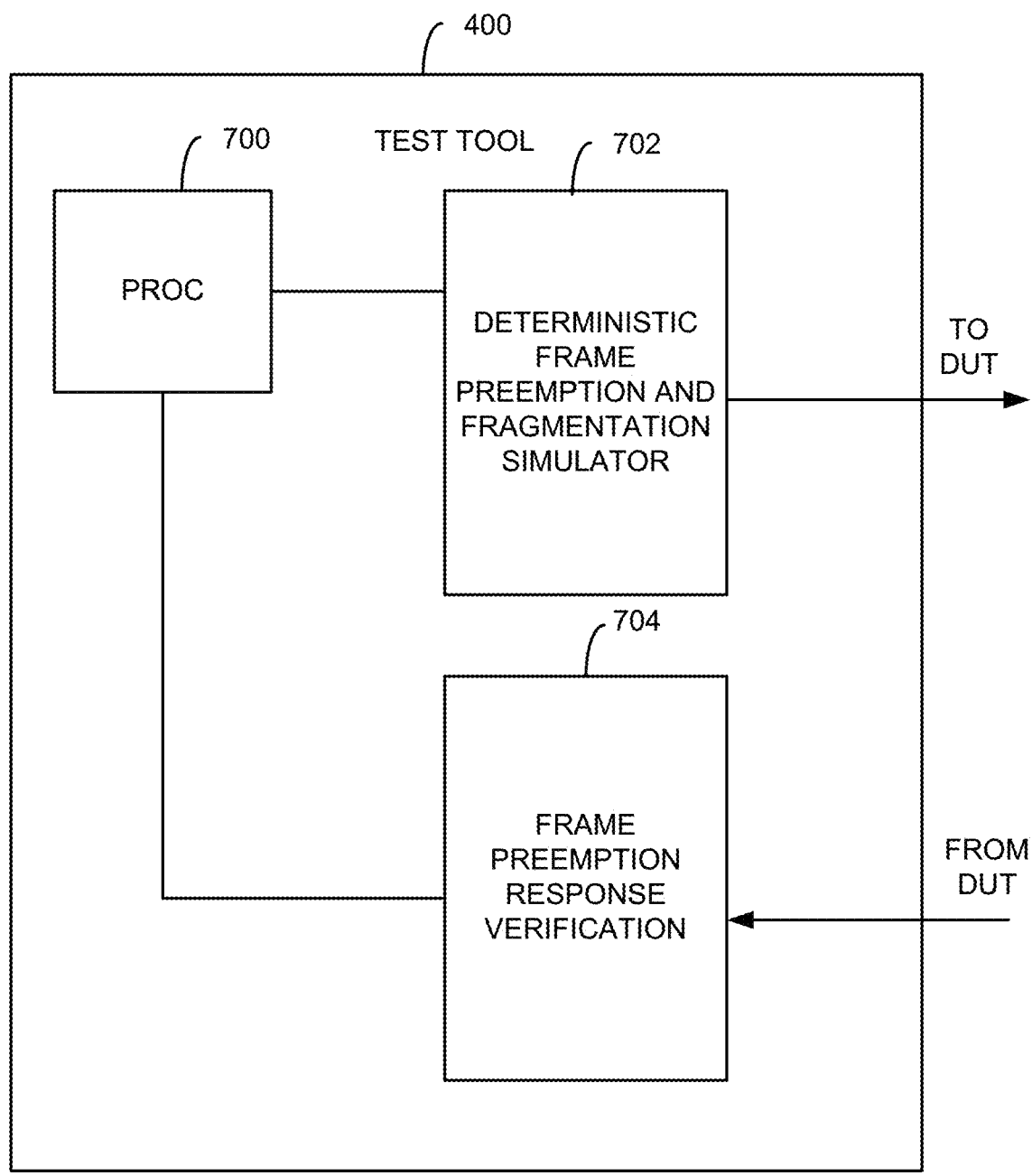
FIG. 7 is a block diagram of a test tool for simulating deterministic fragmentation of preemptable frames and measuring the response of a device under test to the simulated deterministically fragmented frames.

FIG. 7 is a block diagram of a test tool according to the subject matter described herein. Referring to FIG. 7, test tool 400 includes at least one processor 700 that controls the overall operation of test tool 400. A deterministic frame preemption and fragmentation simulator 702 simulates frame preemption by generating frame fragments and express frames and deterministically orders simulated preempted frame fragments and the express frames for transmission to the device under test. Deterministically ordering the simulated preempted frame fragments and the express frames for transmission to the DUT includes setting an order of the preempted frame fragments and the express frames independently from MAC merge sublayer fragmentation and ordering so that the order can be repeated in subsequent tests. In one example, deterministic frame preemption and fragmentation simulator 702 may allow ordering of frame fragments and express frames to be defined by the test operator at the application layer and the frame fragments and express frames may be transmitted to the DUT without passing through MAC merge sublayer fragmentation and ordering so that the order specified by the test operator at the application layer will be the ordering in which express frames and frame fragments are transmitted to the DUT. Allowing such operator-specified ordering to be maintained enables tests to be repeated with the same ordering so that network devices can be consistently tested. In one example, deterministic frame preemption and fragmentation simulator 702 may enable the test operator to define orderings to implement any of the scenarios described above for testing the reassembly functionality of DUT 402.

A frame preemption response verification module 704 receives output from DUT 402 and verifies the functionality of DUT 402. For example, frame preemption response verification module 704 may receive reassembled preempted frames or frame reassembly error output from DUT 402 to determine whether DUT 402 operates in accordance with frame preemption network standards.

Figure 8:
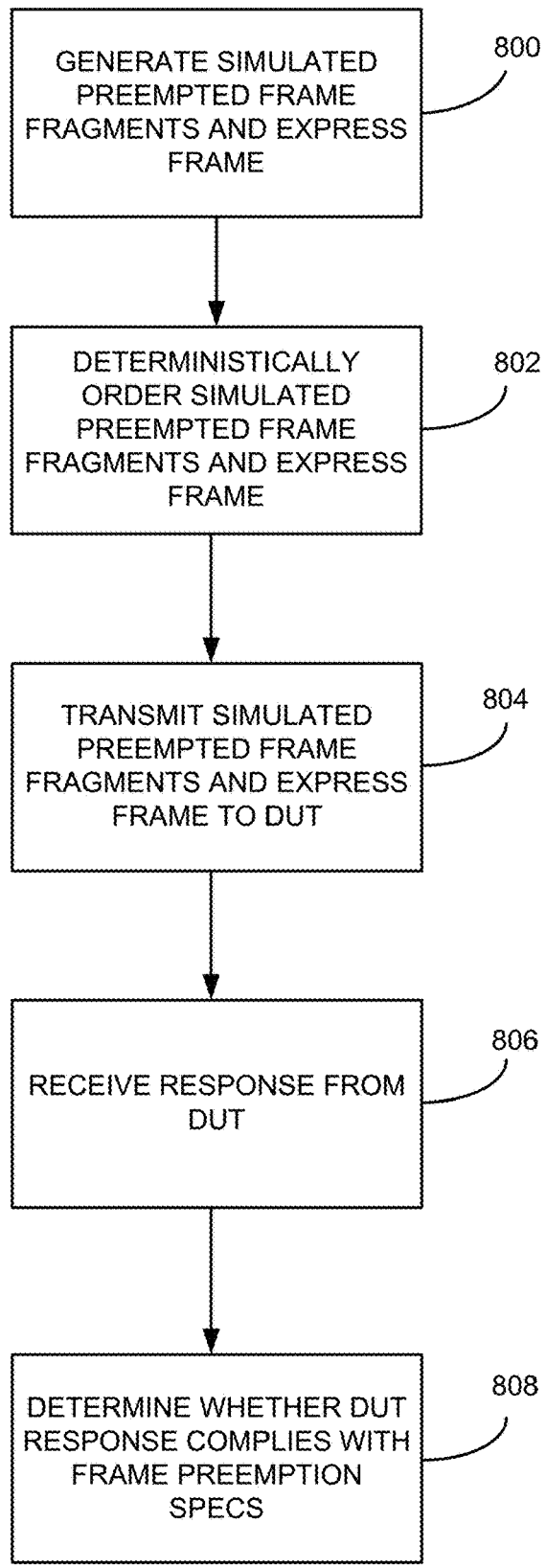
FIG. 8 is a flow chart illustrating an exemplary process for testing a device under test using simulated frame preemption and deterministic fragmentation of preemptable frames.

FIG. 8 is a flow chart illustrating an exemplary process for testing effects of simulated frame preemption and deterministic fragmentation of preemptable frames in a frame-preemption-capable network. Referring to FIG. 8, in step 800 frame preemption is simulated by generating a plurality of simulated preempted frame fragments and one or more express frames. For example, deterministic frame preemption and fragmentation simulator 702 may generate M-packets as illustrated in FIG. 3.

In step 802, the method includes deterministically ordering the simulated preempted frame fragments and the express frame(s) for transmission to the device under test. Deterministically ordering the simulated preempted frame fragments and the express frames for transmission to the DUT includes setting an order of the preempted frame fragments and the express frames independently from MAC merge sublayer fragmentation and ordering so that the order can be repeated in subsequent tests. For example, deterministic frame preemption and fragmentation simulator 702 may generate sequences of preempted fragments and express frames with an ordering specified by the test operator, including but not limited to the orderings illustrated in FIGS. 4-6.

In step 804, the simulated preempted frame fragments and express frame are transmitted to the DUT in an order corresponding to the deterministic ordering. For example, deterministic frame preemption and fragmentation simulator 702 may transmit the sequence of preempted frame fragments and the express frame to the device under test.

In step 806, the test tool receives a response from the device under test to the simulated preempted frame fragments and express frame and in step 808, determines, based on the response, whether the DUT operates in accordance with specifications for frame preemption. For example, frame preemption response verification module 704 may determine whether DUT 402 properly reassembles frames based on the sequence of simulated fragments that were transmitted to the DUT. In another example, frame preemption response verification module 704 may determine whether DUT 402 properly generates reassembly errors when continuation fragments are omitted or transmitted out of order. In yet another example, test tool 400 may stress test DUT 402 by transmitting bursts of valid and/or invalid mPackets to DUT 402, and frame preemption response verification module 704 may monitor the performance of DUT 402 to the mPacket bursts.

The test tool described herein provides a new way of measuring the effectiveness of a device, such as a network switch in performing reassembly of preempted frame fragments in a frame-preemption-capable network. By performing deterministic preempted frame fragment generation, benchmarking the capability of devices during stress testing can be effectively achieved. The capability of injecting erroneous/rogue preempted fragments in an otherwise valid transmission of packets allows testing of the error response of a device under test.

Auto-Generation of Preempted Frame Fragments

According to another aspect of the subject matter described here, a test tool may automatically generate preempted frame fragments. As stated above, time sensitive networking denotes a set of IEEE 802 standards together which extend the functionality of Ethernet networks to better support time-sensitive applications. A key feature in making TSN a reality is the notion of frame preemption.

Consider a quality of service (QoS)-capable switch implementing multiple egress queues on each port, and placing incoming frames into one of these queues based on each frame's "priority" tag. When an egress port has finished transmitting a frame, it selects the frame from the highest priority queue that has a frame ready for transmission. Because each of these queues are serviced by a single MAC controller, once started, a switch cannot abort or interrupt transmission of a frame, even when a frame assigned to a higher priority egress queue becomes available.

Frame preemption helps mitigate the latency impact on the stalled higher priority frame described in the above scenario. Fundamentally, frame preemption allows two different MAC sublayers to share a single link. One MAC controller processes high priority "express" traffic while the other MAC controller processes lower priority preemptable traffic.

If a frame arrives at the express MAC (eMAC) controller while the preemptable MAC (pMAC) controller is transmitting a frame, the preemptable pMAC controller's transmission can be suspended to allow the express traffic to be sent.

If there are no additional express frames to be transmitted, the transmission of the pMAC frame resumes, but may be further suspended with the arrival of additional eMAC traffic. An example of frame preemption is illustrated in FIG. 2 described above.

The ability to interrupt the transmission of a low priority frame in favor of a higher priority frame results in the fragmentation of the preempted traffic. Clause 99 of the IEEE 802.3br Standard defines how fragmented frames should be identified and processed.

A frame-preemption-capable transmitter replaces the standard Ethernet Start of Frame Delimiter (SFD) of a preemptable packet with an SMD code. Four different SMD types are defined:

SMD-V: Verify Packet
SMD-R: Respond Packet
SMD-S: Preemptable Packet Start
SMD-C: Continuation Fragment The encodings for both SMD-C and SMD-S types contain "frame count" information with values that range from 0 to 3.

Additionally, SMD-C fragments include a frag_count encoding that also ranges from 0 to 3.

Two successive preemptable frames could be transmitted as illustrated in FIG. 9. Referring to FIG. 9, the mPacket labeled S0 is the initial fragment of the first preemptable frame. The mPacket labeled Ex-1 is the first express frame. The mPacket labeled C0-0 is the first continuation fragment of the first preemptable frame. The mPacket labeled Ex-2 is the second express frame. The mPacket labeled C0-1 is the second continuation fragment of the first preemptable frame. The mPacket labeled S1 is the first fragment of a second preemptable frame. The mPacket labeled Ex-3 is the third express frame. The mPacket labeled C1-0 is the first continuation fragment of the second peemptable frame. The mPacket labeled C1-1 is the second continuation fragment of the second preemptable frame.

Information about the frame count and frag_count helps prevent reassembling an invalid packet if any portion of the fragmented packet is lost.

In the final mPacket of a frame, the CRC field contains the last 4 bytes of the MAC frame (the FCS field) as defined in Clause 3.2.9 of the IEEE 802.3-2015 Standard. For other mPacket fragments, the CRC field contains an mCRC value which is calculated differently than the FCS. This difference allows a receiver to determine when the final fragment of a frame has been received.

A test tool must be capable of testing the ability of a DUT to correctly reassemble fragmented frames along with its ability to tolerate and recover from faults. To achieve predictability in the delivery of preempted fragments, the test tool must allow for the configuration of individual fragments of different types before transmission. Flexibility in the configuration of preemptable traffic facilitates the simulation of real time network errors which would otherwise be impossible to inject into a live network.

However, it is not just in error testing where a frame-preemption-capable test tool adds value. Testing the ability of a DUT to process a varying mix of error free fragmented traffic is essential.

The test tool describe herein supports the generation of such traffic without burdening the user of the test tool to configure each individual fragment in a long sequence of fragmented traffic. The test tool achieves this goal by providing an auto-configuration mode, which will now be described.

Auto configuration offloads the burden of defining the details of fragmented traffic from the user onto the hardware. The test tool described herein may support the following four classes of auto-configuration:

1. Auto_SMDS: Hardware generates an SMD-S with the frame count automatically incremented from the previous SMD-S frame count that was sent;

2. Auto_SMDC: Hardware generates an SMD-C with a frame count set to the same value as the previous SMD-S frame; and 3. Auto_FragCount: This option allows the user to avoid the burden of configuring frag_count values of different continuation fragments.

4. Auto_SMD: Hardware transmits an SMD-S if the previous mPacket terminated with an FCS. Hardware transmits an SMD-C if the previous SMD-S or SMD-C mPacket had an mCRC.

For example, consider the case where a user wishes to send a frame made up of multiple fragments of the same size. Using the Auto-SMD mPacket definition, two steams can be defined:

Stream1: Auto SMD with mCRC—repeat N times then "goto Stream2"

Stream2: Auto SMD with FCS—then "goto Stream1"

This definition would lead to the following sequence:

$$S_0(mCRC)C_0(mCRC)C_1(mCRC) \ldots C_{N-2}(mCRC)$$
$$C_{N-1}(FCS)$$

As can be seen in the above example, auto-configuration enables the creation of a wide range of fragmentation sequences using a relatively small number of "stream" definitions.

Figure 10:
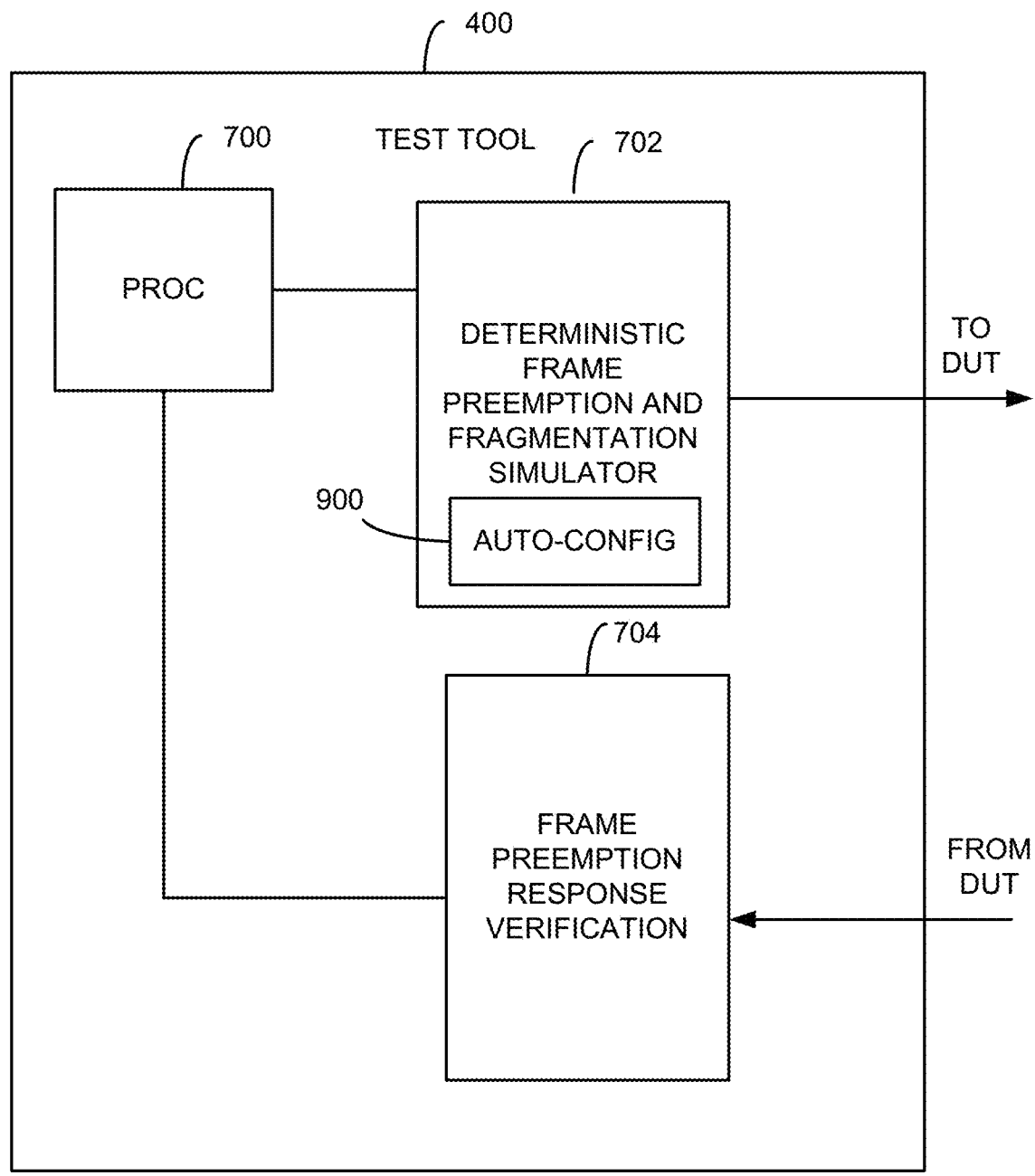
FIG. 10 is a block diagram of a test tool for automatically configuring mPacket streams after receiving a stream definition from a user.

Referring to FIG. 10, deterministic fame preemption and fragmentation simulator 702 includes an auto-configuration module 900 that allows users to specify mPacket streams to be generated using the auto-configuration modes described above and automatically generates the mPacket streams with the incremented frame counts, mCRC, and FCS values described above.

Figure 11:
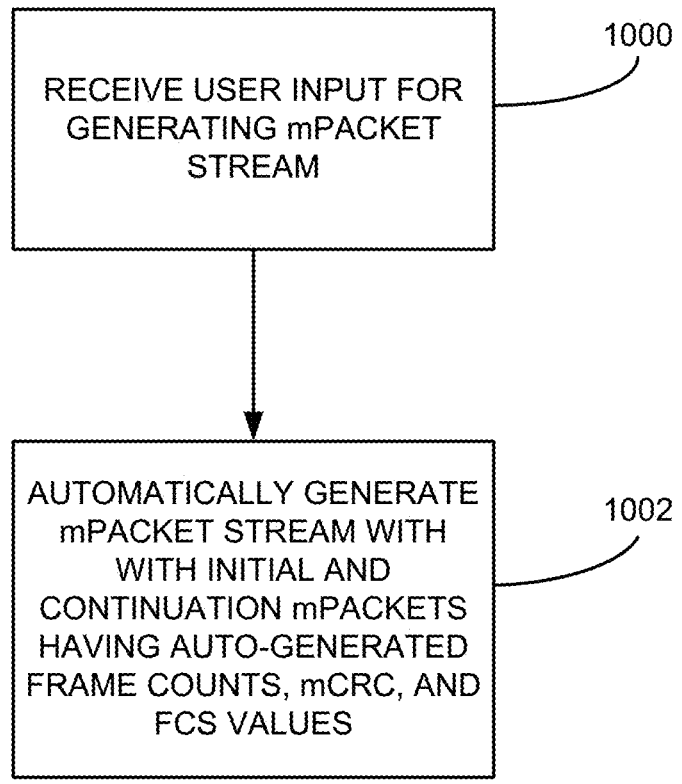
FIG. 11 is a flow chart of an exemplary process for automatically generating mPacket streams after receiving a stream definition from a user.

FIG. 11 is a flow chart illustrating exemplary operation of auto-configuration module 900. Referring to FIG. 11, in step 1000, auto-configuration module 900 receives user input for generating an mPacket stream. For example, auto-configuration module 900 may receive user input for generating an mPacket stream including two preemptable frames, each having an initial mPacket and two continuation mPackets. Using the example described above, the user may specify a frame count of four for each of the frames. In step 1002, auto-configuration module 900 automatically generates the initial mPackets and the continuation mPackets for the stream with the frame counts, mCRC values, and FCS values using the auto-configuration modes described above. For example, auto-configuration module may generate the following sequence of mPacket frames:

$$S_0(mCRC)C0\text{-}0(mCRC)C0\text{-}1(FCS)S1(mCRC)C1\text{-}1$$
$$(mCRC)C1\text{-}2(FCS).$$

Frame-preemption-capable devices are just beginning to deploy into the field and testing fragmentation presents a unique challenge to Ethernet test equipment manufacturers. Auto-configuration of mPacket streams allows test users to easily scale the number of fragments to be generated using a very small set of stream definitions. The auto-configuration mode may facilitate deterministic ordering of frame fragments and express frames. For example, the test operator may utilize auto-configuration module 900 to generate a valid sequence of frame fragments, as illustrated above. The test operator may then misorder one or more of the fragments in the sequence to test the functionality of the DUT to a misordered sequence of fragments.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for testing effects of simulated frame preemption and deterministic frame fragmentation on a device under test (DUT) in a frame-preemption-capable network, the method comprising:
   in a network test tool including at least one processor:
      simulating frame preemption by receiving input from a test operator for deterministically setting an order of simulated preempted frame fragments and an express frame in a single sequence including the simulated preempted frame fragments and the express frame and, in response to the input:
      generating the single sequence including the simulated preempted frame fragments and the express frame, wherein generating the single sequence includes deterministically ordering, in the order specified by the test operator and independently from medium access control (MAC) merge sublayer fragmentation, the simulated preempted frame fragments and the express frame in the single sequence for transmission to the DUT;
      transmitting the single sequence including the simulated preempted frame fragments and the express frame to the DUT in an order corresponding to the deterministic ordering;
      receiving a response of the DUT to the single sequence including the simulated preempted frame fragments and the express frame; and
      determining, based on the response of the DUT, whether the DUT operated in accordance with specifications for frame preemption.

2. The method of claim 1 wherein the simulated preempted frame fragments include merge sublayer packets (mPackets).

3. The method of claim 1 wherein the simulated preempted frame fragments include fragments of at least one simulated preempted frame, wherein the fragments include an initial fragment and one or more continuation fragments.

4. The method of claim 3 wherein deterministically ordering the simulated preempted frame fragments and the express frame includes sequentially ordering the continuation fragments without omitting any of the continuation fragments.

5. The method of claim 4 wherein determining whether the DUT operates in accordance with specifications for frame preemption includes determining whether the DUT properly reassembles at least one frame.

6. The method of claim 3 wherein deterministically ordering the simulated preempted frame fragments includes injecting a misordered continuation frame fragment in the single sequence to be transmitted to the DUT.

7. The method of claim 6 wherein determining whether the DUT operates in accordance with specifications for frame preemption includes determining whether the DUT reports a reassembly error in response to the misordered frame fragment.

8. The method of claim 1 wherein the simulated preempted frame fragments include a frame fragment with an invalid frame check sequence value.

9. The method of claim 8 wherein the frame fragment with the invalid frame check sequence value includes a last continuation fragment of a simulated preempted frame with a merge sublayer packet (mPacket) cyclic redundancy check (mCRC) code instead of a frame check sequence and wherein determining whether the DUT operates in accordance with specifications for frame preemption includes determining whether the DUT reports a frame reassembly error in response to the invalid frame check sequence value.

10. The method of claim 1 wherein receiving the input from the test operator comprises receiving a merge sublayer packet (mPacket) stream definition and wherein generating the single sequence including the simulated preempted frame fragments and the express frame includes automatically generating initial and continuation mPackets with automatically generated frame counts, mPacket cyclic redundancy check (mCRC) values, and frame check sequence (FCS) values.

11. A system for testing effects of simulated frame preemption and deterministic frame fragmentation on a device under test (DUT) in a frame-preemption-capable network, the system comprising:
   a network test tool including at least one processor;
   a deterministic frame preemption and fragmentation simulator implemented by the network test tool, is configurable to simulate frame preemption by receiving input from a test operator for deterministically setting an order of simulated preempted frame fragments and an express frame in a single sequence including the simulated preempted frame fragments and the express frame and, in response to the input:
      generate the single sequence including the simulated preempted frame fragments and the express frame, wherein generating the single sequence includes deterministically ordering, independently from MAC merge sublayer fragmentation and in the order specified by the test operator, the simulated preempted frame fragments and the express frame in the single sequence for transmission to the DUT, and
      transmit the single sequence of the simulated preempted frame fragments and the express frame to the DUT; and
   a frame preemption response verification module implemented by the network test tool receives a response of the DUT to the single sequence of simulated preempted frame fragments and the express frame and determines, based on the response of the DUT, whether the DUT operated in accordance with specifications for frame preemption.

12. The system of claim 11 wherein the simulated preempted frame fragments comprise merge sublayer packets (mPackets).

13. The system of claim 11 wherein the simulated preempted frame fragments include fragments of at least one simulated preempted frame, including an initial fragment and one or more continuation fragments.

14. The system of claim 13 wherein the deterministic frame preemption and fragmentation simulator is configured to sequentially order the continuation fragments without omitting any of the continuation fragments.

15. The system of claim 14 wherein the frame preemption response verification module is configured to determine whether the DUT properly reassembles at least one frame.

16. The system of claim 13 wherein the deterministic frame preemption and fragmentation simulator is configured to inject a misordered continuation frame fragment in the fragments to be transmitted to the DUT.

17. The system of claim 16 wherein the frame preemption response verification module is configured to determine whether the DUT reports a reassembly error in response to the misordered frame fragment.

18. The system of claim 11 wherein the deterministic frame preemption and fragmentation simulator is configured to generate frame fragments with invalid frame check sequence values and wherein the frame preemption response verification module is configured to determine whether the DUT reports a frame reassembly error in response to the invalid frame check sequence values.

19. The system of claim 11 wherein the deterministic frame preemption and fragmentation simulator includes an auto-configuration module that receives the input from the test operator, wherein the input includes a merge sublayer packet (mPacket) stream definition and automatically generates the simulated preempted frame fragments, which include initial and continuation mPackets with automatically generated frame counts, mPacket cyclic redundancy check (mCRC) values, and frame check sequence (FCS) values.

20. A non-transitory computer readable medium having stored thereon executable instructions that when executed by a processor of a computer control the computer to perform steps comprising:

simulating frame preemption by receiving input from a test operator for deterministically setting an order of simulated preempted frame fragments and an express frame in a single sequence including the simulated preempted frame fragments and the express frame and, in response to the input:

generating the single sequence including the simulated preempted frame fragments and an express frame, wherein generating the single sequence includes deterministically ordering, in the order specified by the test operator and independently from medium access control (MAC) sublayer fragmentation, the simulated preempted frame fragments and the express frame in the single sequence for transmission to a device under test (DUT);

transmitting the simulated preempted frame fragments and the express frame to the DUT in an order corresponding to the deterministic ordering;

receiving a response of the DUT to the single sequence including the simulated preempted frame fragments and the express frame; and determining, based on the response of the DUT, whether the DUT operated in accordance with specifications for frame preemption.

* * * * *